(12) United States Patent
Chang

(10) Patent No.: US 7,798,693 B2
(45) Date of Patent: *Sep. 21, 2010

(54) OPTICAL PLATE AND BACKLIGHT MODULE USING THE SAME

(75) Inventor: Shao-Han Chang, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 448 days.

This patent is subject to a terminal disclaimer.

(21) Appl. No.: 11/835,431

(22) Filed: Aug. 8, 2007

(65) Prior Publication Data

US 2008/0266901 A1   Oct. 30, 2008

(30) Foreign Application Priority Data

Apr. 27, 2007   (CN) .................. 2007 1 0200536

(51) Int. Cl.
*F21V 8/00* (2006.01)
(52) U.S. Cl. .................. 362/558; 362/582; 362/560; 362/607
(58) Field of Classification Search .......... 362/558, 362/607, 625, 626, 623, 560, 330, 511, 582
See application file for complete search history.

(56) References Cited

U.S. PATENT DOCUMENTS

| 5,207,493 | A  | * | 5/1993 | Murase et al. ............. 362/623 |
| 5,521,797 | A  | * | 5/1996 | Kashima et al. ............ 362/617 |
| 5,852,514 | A  | * | 12/1998 | Toshima et al. ............ 359/599 |
| 7,178,964 | B2 | * | 2/2007 | Sugiura et al. ............. 362/616 |
| 2007/0002580 | A1 | * | 1/2007 | Ahn et al. ................... 362/561 |
| 2008/0278818 | A1 | * | 11/2008 | Chang ........................ 359/599 |
| 2009/0196071 | A1 | * | 8/2009 | Matheson et al. .......... 362/623 |

FOREIGN PATENT DOCUMENTS

| CN | 1437058 A | 8/2003 |
| JP | 10082916 A | 3/1998 |
| JP | 2001133779 A | 5/2001 |

* cited by examiner

*Primary Examiner*—Sharon E Payne
(74) *Attorney, Agent, or Firm*—Frank R. Niranjan

(57) ABSTRACT

An exemplary optical plate includes at least one transparent plate unit. The transparent plate unit includes a light output surface, a bottom surface, a plurality of spherical depressions, a diffusion layer, and at least one lamp-receiving portion. The bottom surface is opposite to the light output surface. The diffusion layer is formed on the light output surface. The spherical depressions are formed at the bottom surface. The lamp-receiving portion is defined in the bottom surface. A backlight module using the present optical plate is also provided.

15 Claims, 9 Drawing Sheets

OPTICAL PLATE AND BACKLIGHT MODULE USING THE SAME

CROSS-REFERENCE TO RELATED APPLICATIONS

This application is related to six copending U.S. patent applications, which are: application Ser. No. 11/835,425, Ser. No. 11/835,426, Ser. No. 11/835,427, Ser. No. 11/835,428, Ser. No. 11/835,429, Ser. No. 11/835,430, all filed on Aug. 8, 2007, and all entitled "OPTICAL PLATE AND BACKLIGHT MODULE USING THE SAME". In all these copending applications, the inventor is Shao-Han Chang. All of the copending applications have the same assignee as the present application.

BACKGROUND OF THE INVENTION

1. Field of the Invention

The present invention relates to an optical plate for use in, for example, a backlight module, the backlight module typically being employed in a liquid crystal display (LCD).

2. Discussion of the Related Art

In a liquid crystal display device, liquid crystal is a substance that does not itself radiate light. Instead, the liquid crystal relies on light received from a light source, in order that the liquid crystal can provide displaying of images and data. In the case of a typical liquid crystal display device, a backlight module powered by electricity supplies the needed light.

FIG. 9 represents a typical direct type backlight module 100. The backlight module 100 includes a housing 101, a light reflective plate 102, a light diffusion plate 103, a prism sheet 104, and a plurality of light emitting diode 105 (hereinafter called LED). The housing 101 includes a rectangular base 1011 and four sidewalls 1013 extending from a periphery of the base 1011. The base 1011 and the four sidewalls 1013 cooperatively define a chamber 107. Each LED 105 includes a base portion 1053 and a light-emitting portion 1051 disposed on the base portion 1053. The LEDs 105 are electrically connected to a printed circuit board (not labeled), and the printed circuit board is fixed to the base 1011 of the housing 101. The light reflective plate 102 is disposed on the LEDs 105 in the chamber 107. The light reflective plate 102 defines a plurality of through holes (not labeled) that allows the light-emitting portions 1051 of the LED 105 to pass through and to emit light to be transmitted to the light diffusion plate 103. The light diffusion plate 103 is stacked on the prism sheet 104 in the chamber 107. Light emitted from the LEDs 105 is substantially reflected by the light reflective sheet 102 to the light diffusion plate, diffused uniformly in the light diffusion plate 103, and exit the prism sheet 104 as surface light.

Generally, a plurality of dark areas may occur because of the reduced intensity of light between adjacent LEDs 105. In the backlight module 100, each LED 105 further includes a reflective sheet 106 disposed on the top of the light-emitting portion 1051, configured for decreasing the brightness of a portion of the backlight module 100 above the LED 105. However, the brightness of the backlight module 100 is still unduly non-uniform.

What is needed, therefore, is a new optical plate and a backlight module using the optical plate that can overcome the above-mentioned shortcomings.

SUMMARY

An optical plate according to a preferred embodiment includes at least one transparent plate unit. The transparent plate unit includes a light output surface, a bottom surface, a plurality of spherical depressions, a diffusion layer, and a lamp-receiving portion. The bottom surface is opposite to the light output surface. The diffusion layer is formed on the light output surface. The spherical depressions are formed at the bottom surface. The lamp-receiving portion is defined in the bottom surface.

A backlight module according to a preferred embodiment includes a housing, a point light source, a reflective member and an optical plate. The housing includes a base and a plurality of sidewalls extending around a periphery of the base, the base and the sidewalls cooperatively forming an opening. The point light source is disposed on the base, each point light source having a light-emitting portion. The reflective member is positioned above the top of the light-emitting portion. The same optical plate as described in the previous paragraph is employed in this embodiment. The light-emitting portion of the point light source is inserted in the lamp-receiving portion of the optical plate correspondingly. The diffusion layer of the optical plate faces the opening of the housing.

Other advantages and novel features will become more apparent from the following detailed description of various embodiments, when taken in conjunction with the accompanying drawings.

BRIEF DESCRIPTION OF THE DRAWINGS

The components in the drawings are not necessarily drawn to scale, the emphasis instead being placed upon clearly illustrating the principles of the present optical plate and backlight module. Moreover, in the drawings, like reference numerals designate corresponding parts throughout several views, and all the views are schematic.

DETAILED DESCRIPTION OF THE PREFERRED EMBODIMENTS

Reference will now be made to the drawings to describe preferred embodiments of the present optical plate and backlight module, in detail.

Figure 1:
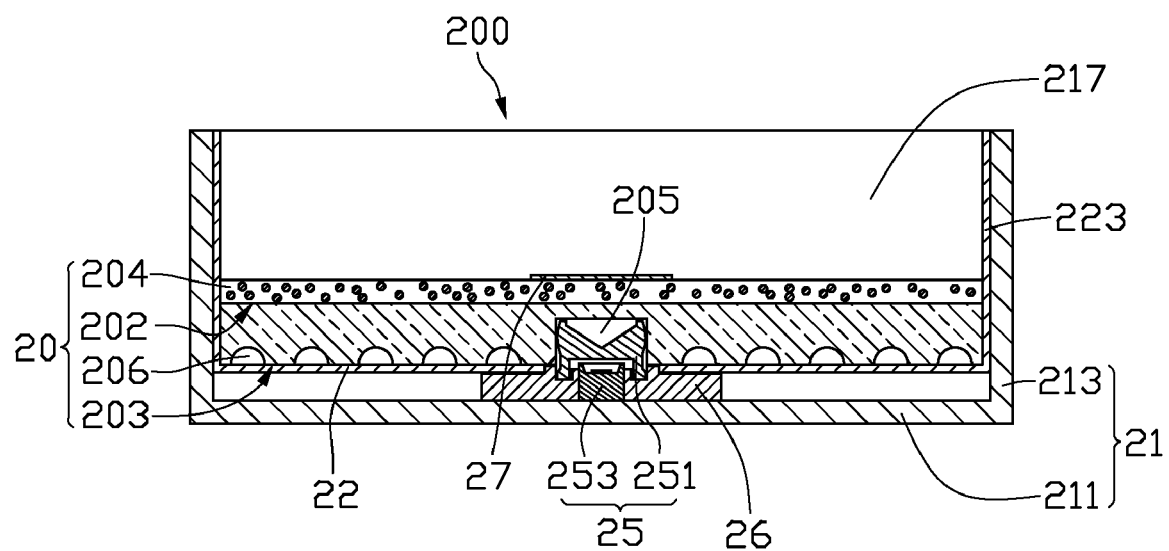
FIG. 1 is a side cross-sectional view of a backlight module using an optical plate according to a first preferred embodiment of the present invention.

Referring to FIG. 1, a backlight module 200 in accordance with a first preferred embodiment is shown. The backlight module 200 includes an optical plate 20, a housing 21, a light reflective plate 22, a LED 25, and a reflective member 27. The housing 21 includes a rectangular base 211 and four sidewalls 213 extending around a periphery of the base 211 correspondingly. The base 211 and the sidewalls 213 cooperatively form an opening 217. The optical plate 20, the light reflective plate 22, the LED 25 and the reflective member 27 are received in the housing 21.

Figure 2:
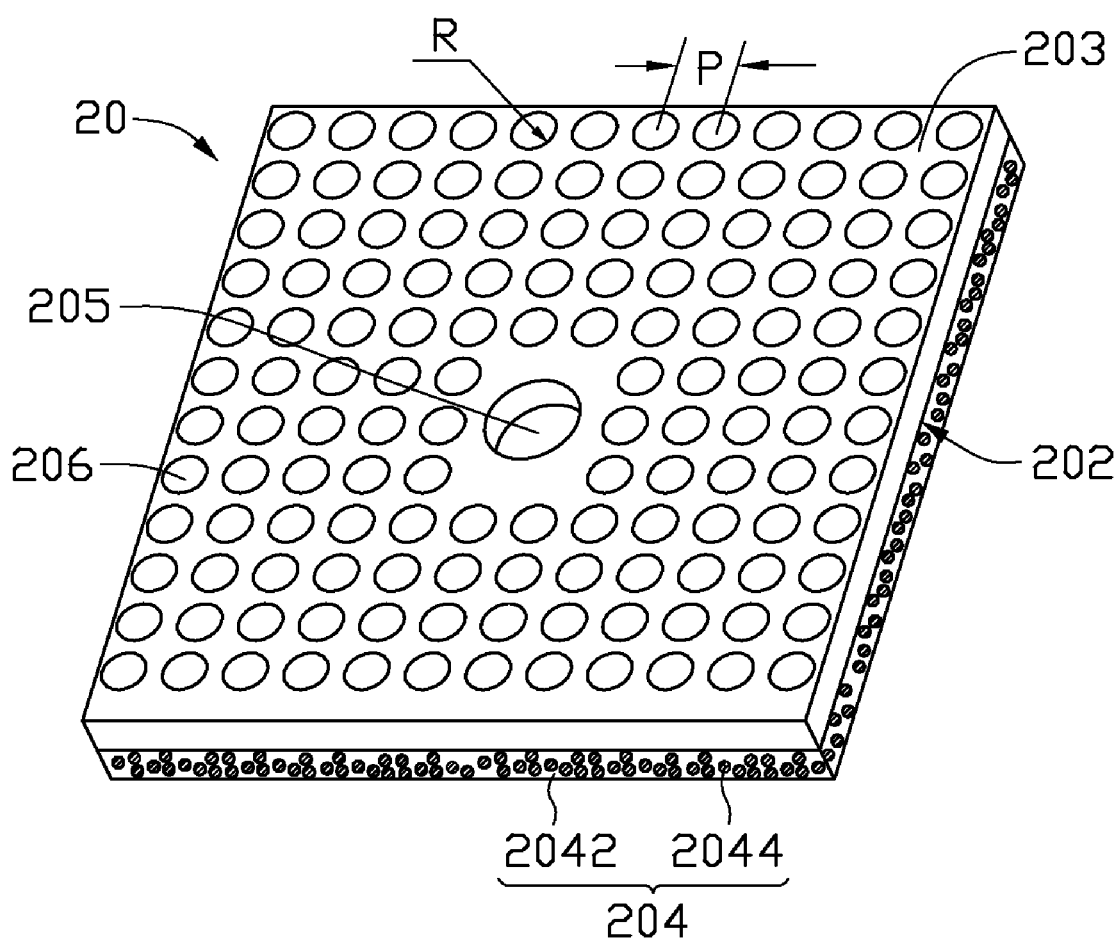
FIG. 2 is an isometric view of the optical plate of FIG. 1.

Also referring to FIG. 2, the optical plate 20 can be mounted into the housing 21. The optical plate 20 includes a light output surface 202, a bottom surface 203, a diffusion layer 204, and plurality of spherical depressions 206. The bottom surface 203 is opposite to the light output surface 202. The diffusion layer 204 is formed on the light output surface 202. The spherical depressions 206 are defined at the bottom surface 203. The diffusion layer 204 has a uniform thickness and cover the light output surface 202 entirely. The optical plate 20 further includes a lamp-receiving portion 205 defined in a center of the bottom surface 203. In this embodiment, the lamp-receiving portion 205 is a blind hole that is depressed towards the light output surface 202.

The optical plate 20 can be made from transparent material selected from the group consisting of polycarbonate (PC), polymethyl methacrylate (PMMA), polystyrene (PS), copolymer of methylmethacrylate and styrene (MS), and any suitable combination thereof. The diffusion layer 204 includes transparent resin matrix material 2042, and diffusion particles 2044 uniformly dispersed in the transparent resin matrix material 2042. The light diffusion layer 22 is manufactured by solidifying an ink layer that is coated on the light output surface 202. The ink layer includes a varnish and a plurality of diffusion particles 2044 dispersed in the varnish. The varnish is preferably acrylic varnish. The transparent resin matrix material 2042 is made of acrylic from the varnish. The diffusion particles 2044 are selected from a group consisting of glass beads, silicon dioxide ($SiO_2$) particles, PMMA particles, and any combination thereof.

The spherical depressions 206 are distributed on the bottom surface 203 in a matrix manner except for an area of the lamp-receiving portion 205. As seen in FIG. 2, in the preferred embodiment, the spherical depressions 206 surround the lamp-receiving portion 205. A radius R defined by each spherical depression 206 is in a range from about 0.01 millimeters to about 2 millimeters. A depth of each spherical depression 206 is preferably greater than 0.01 millimeters, and equal to or greater than its radius R. A pitch P of the two adjacent spherical depressions 206 is defined by a following formula: $2R \leq P \leq 4R$. In this embodiment, each of the spherical depressions 206 is a hemispherical depression.

Also referring to FIG. 1, in this embodiment, the LED 25 includes a base portion 253, and a light-emitting portion 251 disposed on the base portion 253. The LED 25 is electrically connected to a printed circuit board 26 that is fixed to the base 211 of the housing 21. In this embodiment, the reflective member 27 is a light reflective film that is positioned on the diffusion layer 204 of the optical plate 20. In an alternative embodiment, the reflective member 27 can be disposed on the top of the light-emitting portion 251, and the reflective member 27 and the LED 25 can be inserted into the blind hole of lamp-receiving portion 205 together. The optical plate 20 is correspondingly positioned in the housing 21 such that the lamp-receiving portion 205 of the optical plate 20 receives the light-emitting portion 251 of the LED 25 and the light output surface 202 of the optical plate 20 faces the opening 217. The light reflective plate 22 defines a through hole (not labeled). The light reflective plate 22 is disposed underneath the bottom surface 203 of the optical plate 20, the LED 25 passing through the light reflective plate 22 via the through hole.

In use, light emitted from the light-emitting portion 251 of the LED 25 enters the optical plate 20 via an inner surface of the lamp-receiving portion 204. A significant amount of light transmits to the optical plate 20. An amount of light is reflected at the spherical depressions 206 and/or the light reflective plate 22, and finally is outputted from the light output surface 202. Accordingly, a light energy utilization rate of the backlight module 200 is increased. In addition, the light from the light output surface 202 can be further diffused in the diffusion layer 204 for improving the uniformity of light outputted.

It should be pointed out that, the light reflective plate 22 can be omitted. In an alternative embodiment, a high reflectivity film can be deposited on inner surfaces of the base 211 and the sidewalls 213 of the housing 21. In other alternative embodiments, the housing 21 is made of metal materials and having high reflectivity inner surfaces.

It is to be understood that, in order to improve the brightness of the backlight module 200 at a specific range of viewing angles, the backlight module 200 can further include a transparent sheet (not shown) and a prism sheet (not shown) disposed on the top of the housing 21 over the opening 217 in that order. In addition, in order to improve light energy utilization rate of the backlight module 200, the light reflective plate 22 can further include four reflective sidewalls 223 extending around a periphery thereof, and the sidewalls 223 are in contact with the corresponding sidewalls 213 of the housing 21. Further, the spherical depressions 206 at the bottom 202 may be distributed in other manners, such as, for example, an array of spherical depressions 206 in the matrix manner can be aligned along a direction slanted with respect to a side surface of the optical plate 20.

Figure 3:
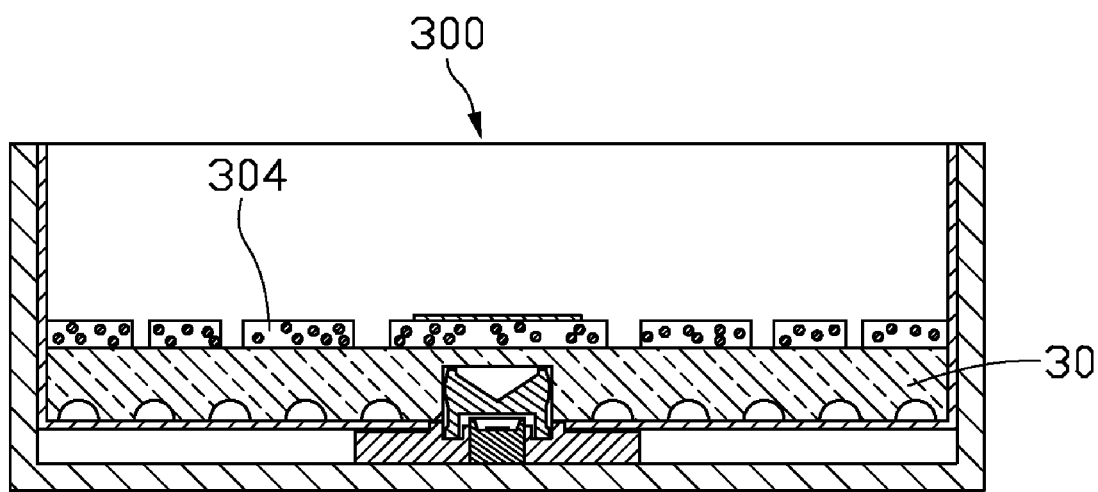
FIG. 3 is a side cross-sectional view of a backlight module according to a second preferred embodiment of the present invention.

Referring to FIG. 3, a backlight module 300 in accordance with a second preferred embodiment is shown. The backlight module 300 is similar in principle to the backlight module 200. However, a diffusion layer 304 of the optical plate 30 of the backlight module 300 is a diffusion dot pattern that includes a plurality of dots arranged apart in a random manner.

Figure 4:
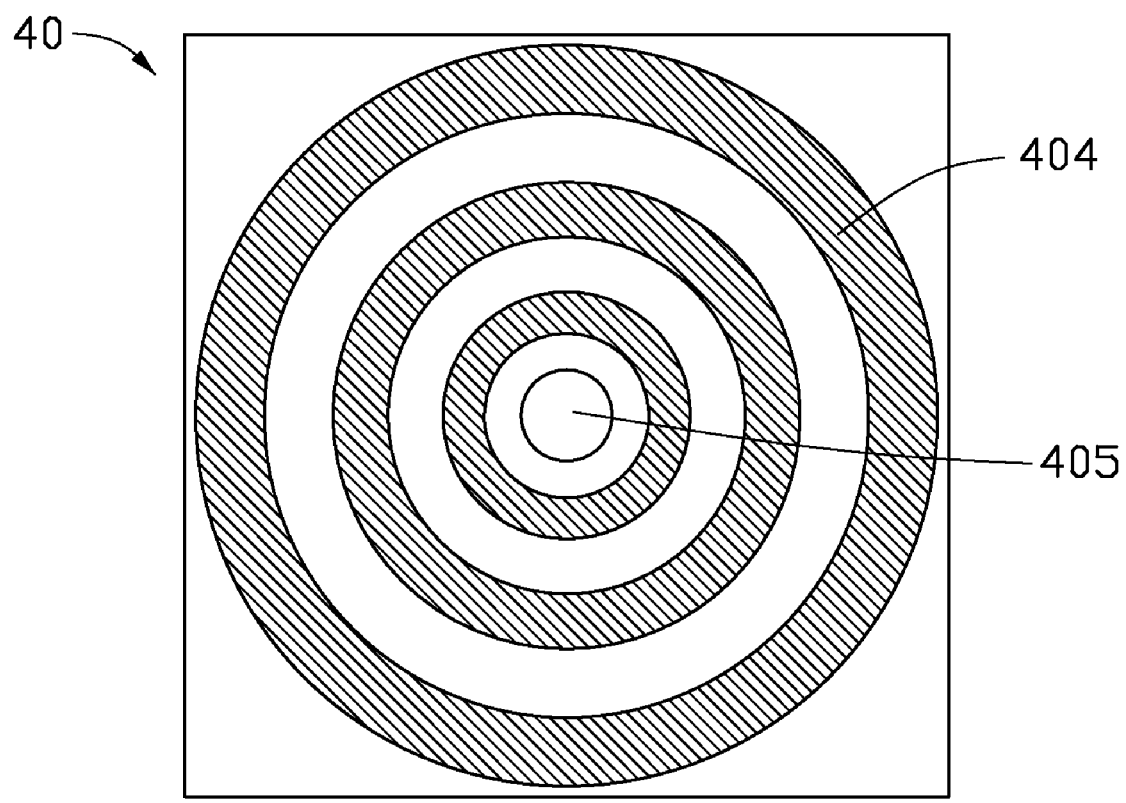
FIGS. 4 through 6 are top plan views of distributions of diffusion layer of the optical plate of the present invention.
Figure 5:
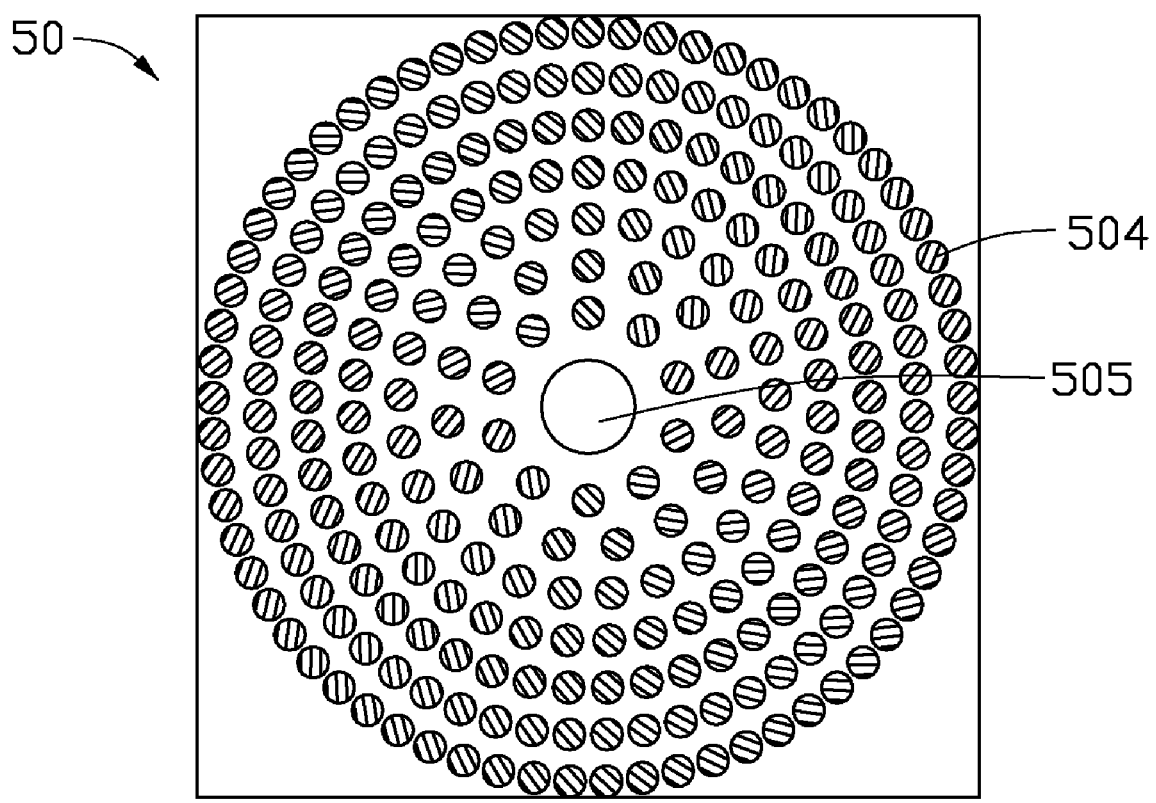
Figure 6:
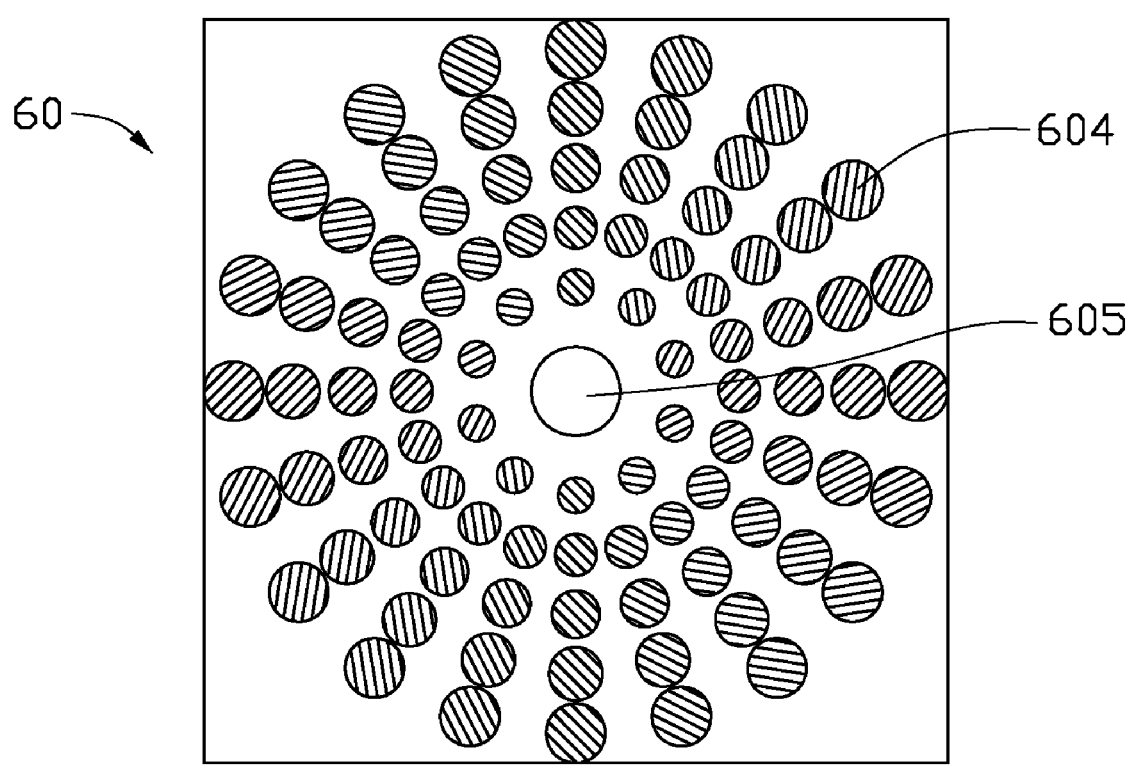

In the other alternative embodiments, the diffusion layer 304 of optical plate 30 can be distributed in other diffusion dot patterns or diffusion strip patterns as shown in FIGS. 4 through 6.

Referring to FIG. 4, a distribution design of a diffusion layer is described below. A diffusion layer 404 of an optical plate 40 is composed of three (or more) annular strips arranged apart. Centers of the three annular strips of the diffusion layer 404 can be aligned at a portion of the lamp-receiving portion 405 of the optical plate 40. Furthermore, a radial thickness of each of the annular strips can increase along a direction away from the lamp-receiving portion 405.

Referring to FIG. 5, another distribution design of a diffusion layer is described below. A diffusion layer 504 of an optical plate 50 is composed of a plurality of circular dots. The circular dots are substantially identical to each other. The circular dots are arranged separately along a plurality of imaginary circles that have a same center. The center of the imaginary circles is also a point of a lamp-receiving portion 505 of the optical plate 50. Furthermore, the distribution densities of circular dots of each imaginary circle can increase along a direction away from the lamp-receiving portion 505.

Referring to FIG. 6, a still another distribution design of a diffusion layer is described below. A diffusion layer 604 of an optical plate 60 is composed of a plurality of circular dots. The circular dots are arranged radially from a lamp-receiving portion 605 of the optical plate 60. Sizes of the circular dots at different distance away from the lamp-receiving portion 605 are different. The sizes and distribution densities of the circular dots increase as a distance of the circular dots from the lamp-receiving portion 605.

Figure 7:
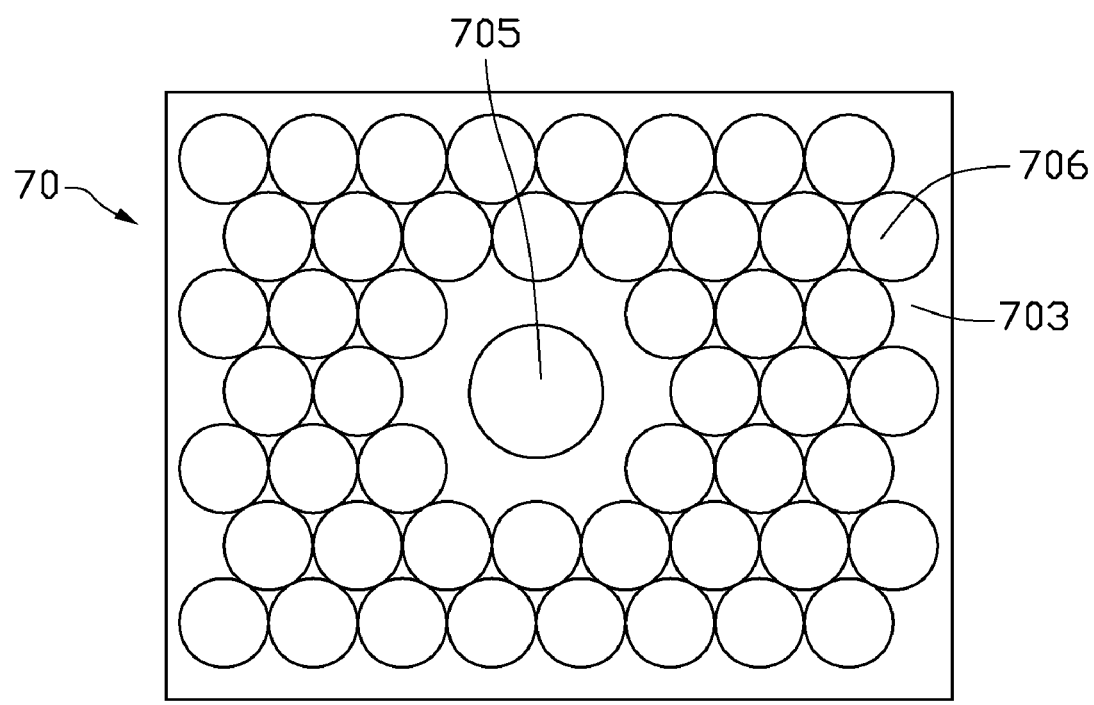
FIG. 7 is a bottom plan view of an optical plate according to a third preferred embodiment of the present invention.

Referring to FIG. 7, an optical plate 70 in accordance with a third preferred embodiment is shown. The optical plate 70 is similar in principle to the optical plate 20 of the first embodiment, except that a distribution of spherical depressions 706 of a bottom surface 703 is different from that of the optical plate 20. The spherical depressions 706 are arranged on the bottom surface 703 side by side except for an area adjacent a lamp-receiving portion 705 of the optical plate 70.

Figure 8:
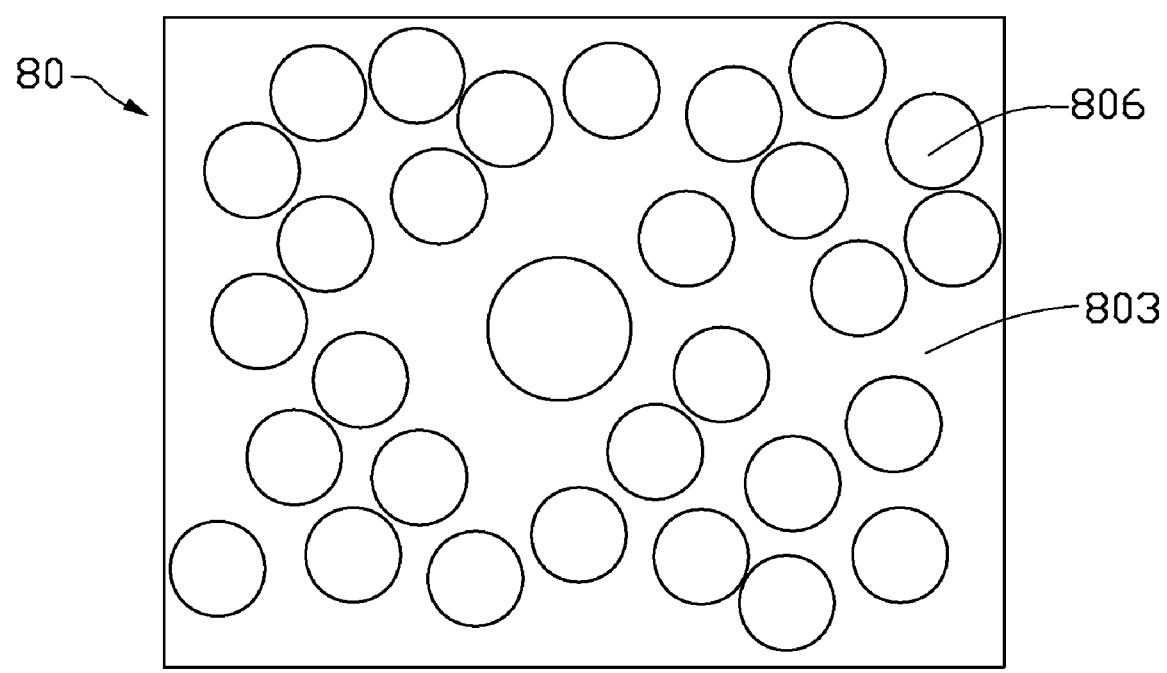
FIG. 8 is a bottom plan view of an optical plate according to a fourth preferred embodiment of the present invention.
Figure 9:
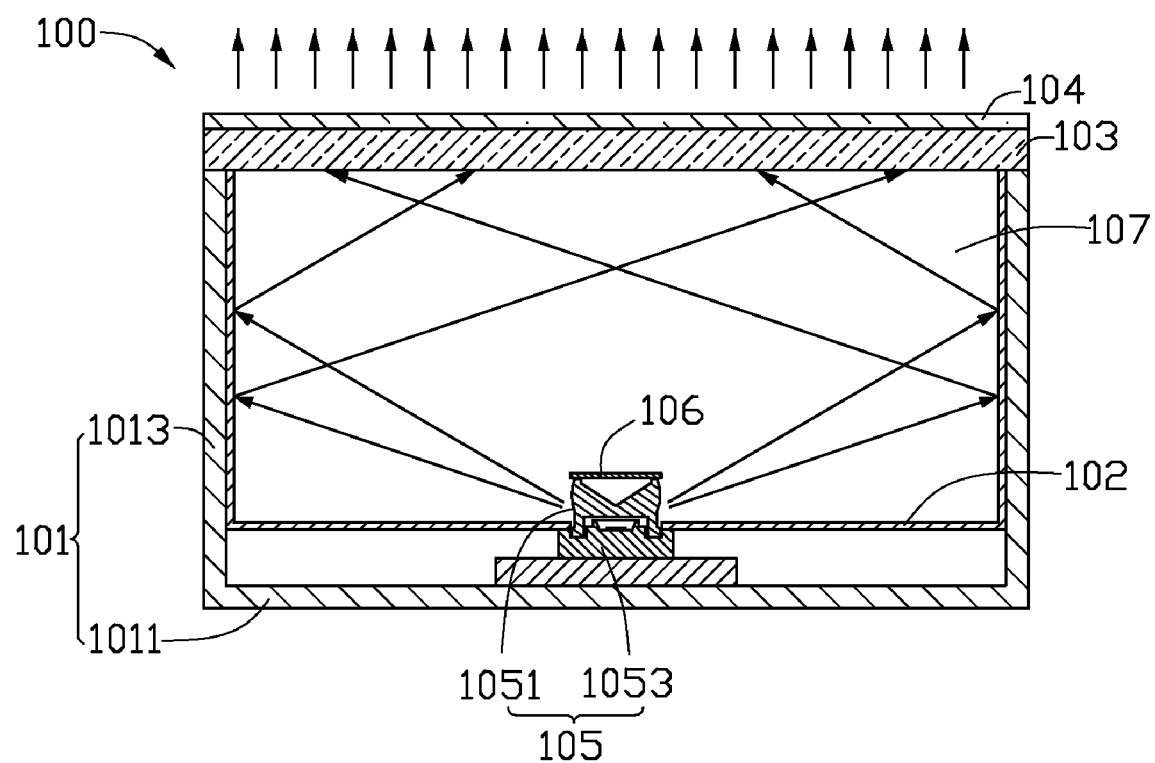
FIG. 9 is a side cross-sectional view of a conventional backlight module.

Referring to FIG. 8, an optical plate 80 in accordance with a fourth preferred embodiment is shown. The optical plate 80 is similar in principle to the optical plate 70 of the third embodiment, except that a distribution of spherical depressions 806 of a bottom surface 803 is different from that of the optical plate 70. The spherical depressions 806 are arranged on the bottom surface 803 in a random manner.

It is to be understood that, lamp-receiving portion of the optical plates 20, 30, 40, 50, 60, 70, 80 can be a blind hole. It should be pointed out that, a side-lighting type LED (not shown) without a reflective member can be mounted into the lamp-receiving portion of the optical plate to form a backlight module. Alternatively, a reflective member of the LED can be also positioned on a center of the optical plate above the lamp-receiving portion.

In a backlight module using a plurality of optical plates combined side by side, a plurality of red, green, and blue colored LEDs can be inserted into the lamp-receiving portions of the combined optical plates correspondingly, such that a mixed white surface light can be obtained. It is to be understood that other kinds of point light source, such as field emission lamps and so on, can replace the LEDs in above embodiments.

Finally, while various embodiments have been described and illustrated, the invention is not to be construed as being limited thereto. Various modifications can be made to the embodiments by those skilled in the art without departing from the true spirit and scope of the invention as defined by the appended claims.

What is claimed is:

1. An optical plate comprising:
   at least one transparent plate unit having:
   a light output surface;
   a bottom surface opposite to the light output surface;
   a diffusion layer formed on the light output surface;
   a plurality of spherical depressions formed at the bottom surface; and
   at least one lamp-receiving portion defined in the bottom surface, wherein the diffusion layer comprises a plurality of circular strips arranged separately; a center of each of the circular strips aligns within a portion of the at least one lamp-receiving portion; and a radial thickness of each circular strip increases with increasing radius.

2. The optical plate according to claim 1, wherein the lamp-receiving portion is defined in a center of the bottom surface and the spherical depressions surrounding the lamp-receiving portion.

3. The optical plate according to claim 1, wherein the diffusion layer comprises transparent resin matrix material, and diffusion particles dispersed in the transparent resin matrix material.

4. The optical plate according to claim 3, wherein the light diffusion layer is manufactured by solidifying an ink layer that is coated on the light output surface; the ink layer comprises a varnish and a plurality of diffusion particles dispersed in the varnish.

5. The optical plate according to claim 3, wherein the diffusion particles are selected from a group consisting of glass beads, silicon dioxide particles, PMMA particles, and any combination thereof.

6. The optical plate according to claim 1, wherein the spherical depressions are arranged on the bottom surface in a matrix manner.

7. The optical plate according to claim 1, wherein the lamp-receiving portion is selected from one of blind hole and through hole communicating between the light output surface and the bottom surface.

8. The optical plate according to claim 1, wherein the diffusion layer has a uniform thickness and covers the light output surface entirely.

9. A backlight module comprising:
   a housing having a base and a plurality of sidewalls extending from a periphery of the base, the base and the sidewalls cooperatively forming an opening;
   at least one point light source disposed on the base, each point light source having a light-emitting portion;
   at least one reflective member is positioned above the top of the light-emitting portion; and
   an optical plate positioned in the housing, the optical plate including at least one transparent plate unit having:
   a light output surface;
   a bottom surface opposite to the light output surface;
   a diffusion layer formed on the light output surface;
   a plurality of spherical depressions formed at the bottom surface; and
   at least one lamp-receiving portion defined in the bottom surface, wherein the light-emitting portion of the at least one point light source is inserted in the lamp-receiving portion correspondingly, the diffusion layer facing the opening of the housing, wherein the diffusion layer comprises a plurality of circular strips arranged separately; a center of each of the circular strips aligns within a portion of the at least one lamp-receiving portion; and a radial thickness of each circular strip increases with increasing radius.

10. The backlight module according to claim 9, further comprising a light reflective plate defining a through hole therein, the light reflective plate being disposed underneath the bottom surface of the optical plate, and the point light source passing through the light reflective plate via the through hole.

11. The backlight module according to claim 10, wherein the light reflective plate further comprises a plurality of reflective sidewalls extending around a periphery thereof and the reflective sidewalls are in contact with the corresponding sidewalls of the housing.

12. The backlight module according to claim 9, wherein the housing is made of metal materials, and has high reflectivity inner surfaces.

13. The backlight module according to claim 9, further comprising a high reflectivity film deposited on inner surfaces of the base and the sidewalls of the housing.

14. The backlight module according to claim 9, wherein the lamp-receiving portion is defined in a center of the bottom surface, the spherical depressions surrounding the lamp-receiving portion.

15. The backlight module according to claim 9, wherein the lamp-receiving portion is selected from one of blind hole and through hole communicating between the light output surface and the bottom surface.

* * * * *